United States Patent
Cho et al.

(10) Patent No.: US 10,003,103 B2
(45) Date of Patent: Jun. 19, 2018

(54) ADDITIVE HAVING CYANO GROUP FOR NON-AQUEOUS ELECTROLYTE AND ELECTROCHEMICAL DEVICE USING THE SAME

(71) Applicant: LG CHEM, LTD., Seoul (KR)

(72) Inventors: Jeong-Ju Cho, Daejeon (KR); Ho Chun Lee, Daejeon (KR); Yong Su Choi, Cheongju-si (KR); Jong-Ho Jeon, Daejeon (KR)

(73) Assignee: LG CHEM, LTD., Seoul (KR)

( * ) Notice: Subject to any disclaimer, the term of this patent is extended or adjusted under 35 U.S.C. 154(b) by 363 days.

(21) Appl. No.: 14/798,693

(22) Filed: Jul. 14, 2015

(65) Prior Publication Data

US 2015/0333372 A1    Nov. 19, 2015

Related U.S. Application Data

(62) Division of application No. 11/774,880, filed on Jul. 9, 2007, now Pat. No. 9,287,583.

(30) Foreign Application Priority Data

Jul. 7, 2006 (KR) .......................... 10-2006-0063864

(51) Int. Cl.
*H01M 10/0567* (2010.01)
*H01M 10/0525* (2010.01)
(Continued)

(52) U.S. Cl.
CPC .......... *H01M 10/0567* (2013.01); *H01G 9/04* (2013.01); *H01M 4/628* (2013.01);
(Continued)

(58) Field of Classification Search
CPC .......... H01M 4/13–4/137; H01M 4/62–4/628; H01M 10/0567; H01M 10/0525;
(Continued)

(56) References Cited

U.S. PATENT DOCUMENTS 4,096,171 A * 6/1978 Benzie ................. C07C 253/10
558/339
2004/0002002 A1 1/2004 Mizuta et al.
(Continued)

FOREIGN PATENT DOCUMENTS

EP    0 694 935 A1    1/1996
EP    1 363 298 A1    11/2003
(Continued)

OTHER PUBLICATIONS

ChemicalBook, "1,4-Dicyano-2-Butene" Dec. 2017, http://www.chemicalbook.com/ChemicalProductProperty_EN_CB0451866.htm, pp. 1-2.*
(Continued)

*Primary Examiner* — Eugenia Wang
(74) *Attorney, Agent, or Firm* — Birch, Stewart, Kolasch & Birch, LLP

(57) ABSTRACT

Disclosed is an additive for a non-aqueous electrolyte, which is a compound having a double bond and at least two cyano groups, the two cyano groups being in a transformation to the double bond. Also, a non-aqueous electrolyte comprising the additive and an electrochemical device comprising the non-aqueous electrolyte are also disclosed. Further, an electrode comprising the cyano group-containing compound and an electrochemical device comprising the electrode are disclosed.

5 Claims, 2 Drawing Sheets

(51) Int. Cl.
    *H01M 6/16*     (2006.01)
    *H01M 4/62*     (2006.01)
    *H01B 1/12*     (2006.01)
    *H01G 9/022*     (2006.01)
    *H01G 9/04*     (2006.01)

(52) U.S. Cl.
    CPC ......... *H01M 10/0525* (2013.01); *H01B 1/122* (2013.01); *H01G 9/022* (2013.01); *H01M 6/168* (2013.01); *H01M 2300/0025* (2013.01)

(58) Field of Classification Search
    CPC .......... H01M 6/168; H01M 2300/0025; H01G 9/022; H01G 9/04; H01B 1/122
    See application file for complete search history.

(56) References Cited

U.S. PATENT DOCUMENTS

| | | | |
|---|---|---|---|
| 2006/0024584 A1* | 2/2006 | Kim | H01M 4/131 429/326 |
| 2006/0035144 A1 | 2/2006 | Shimizu et al. | |
| 2006/0092597 A1 | 5/2006 | Takeda et al. | |
| 2006/0194118 A1 | 8/2006 | Yew et al. | |
| 2008/0102369 A1* | 5/2008 | Sakata | H01M 4/13 429/188 |

FOREIGN PATENT DOCUMENTS

| | | |
|---|---|---|
| EP | 1 508 934 A1 | 2/2005 |
| EP | 1 696 0501 A1 | 8/2006 |
| JP | 07-176322 | 7/1995 |
| JP | 2004-186236 A | 7/2004 |
| KP | 10-2004-0037154 A | 5/2004 |
| KR | 10-2005-0020067 A | 3/2005 |
| KR | 10-2005-0091380 A | 9/2005 |
| WO | WO 97/35332 | 9/1997 |
| WO | WO 2005/069423 A1 | 7/2005 |

OTHER PUBLICATIONS

Certified English translation of JP-2004-186236, Feb. 2004.
Defintion of alkylene; http://www.allwords.com/word-alkylene.html; Mar. 1, 2011.
Supplementary European Search Report issued in European PatentApplication No. 07768575.8 dated Nov. 17, 2009.

* cited by examiner

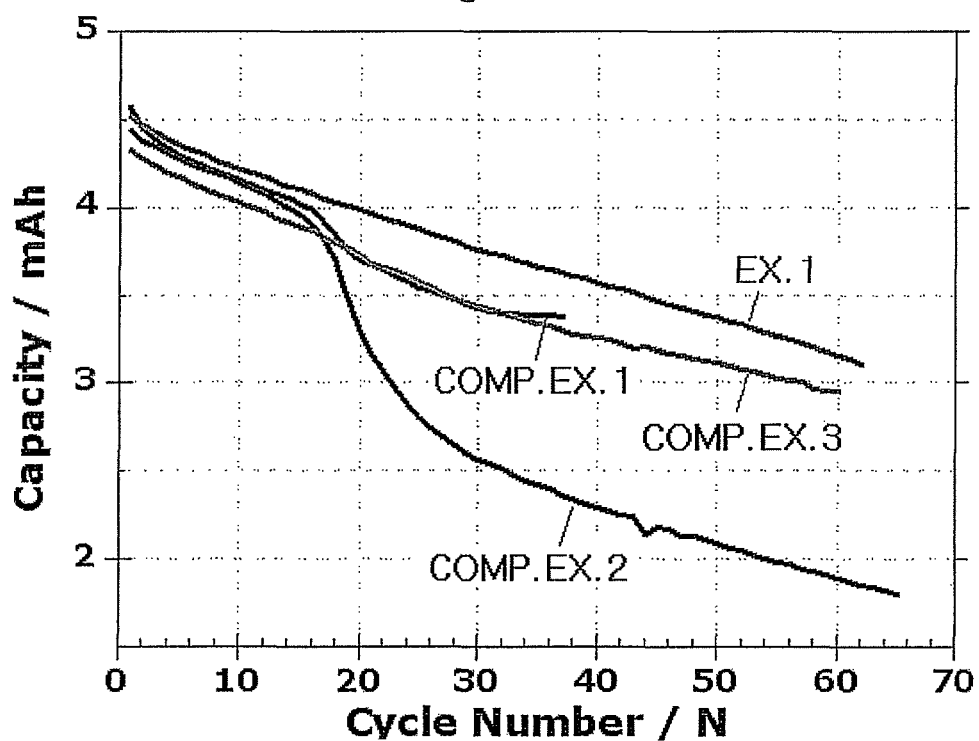

ADDITIVE HAVING CYANO GROUP FOR NON-AQUEOUS ELECTROLYTE AND ELECTROCHEMICAL DEVICE USING THE SAME

This application is a Divisional of application Ser. No. 11/774,880, filed on Jul. 9, 2007 (now U.S. Pat. No. 9,287,583), which claims priority under 35 U.S.C. § 119(a) to Application No. 10-2006-0063864, filed in Korea on Jul. 7, 2006, all of which are hereby expressly incorporated by reference into the present application.

BACKGROUND OF THE INVENTION (a) Field of the Invention

The present invention relates to an additive for a non-aqueous electrolyte which has a low reduction potential and high oxidation stability, a non-aqueous electrolyte comprising the same additive to improve the overall quality of an electrochemical device, and an electrochemical device comprising the same non-aqueous electrolyte.

(b) Description of the Related Art

Recently, as electronic appliances have been downsized and lightened, it has been required to downsize and lighten batteries serving as power sources for the electronic appliances. As a compact, low-weight and high-capacity rechargeable battery, a lithium secondary battery has been commercialized and used widely in portable electronic and communication instruments, such as compact video cameras, portable phones, notebook computers, etc.

A lithium secondary battery comprises a cathode, an anode and an electrolyte. Upon the first charge cycle, lithium ions deintercalated from a cathode active material are intercalated into an anode active material, such as carbon particles, and then are deintercalated again upon discharge. In this way, the battery is rechargeable since the lithium ions serve to transfer energy while reciprocating between both electrodes.

However, as the battery repeats charge/discharge cycles, the cathode active material undergoes a structural collapse, resulting in degradation of the quality of the cathode. Additionally, metal ions dissolved out from the cathode surface upon the structural collapse of the cathode cause electrodeposition onto the anode, resulting in deterioration of the anode. Such degradation of the quality of the battery tends to be accelerated when the cathode potential increases or the battery is exposed to a high temperature.

To solve the above-mentioned problems, a method for adding a material that forms a coating layer on a cathode to protect the cathode to an electrolyte has been suggested (Electrochemical and Solid-State Letters, 7, A462~465 (2004)). Additionally, it has been suggested that an iodine or bromine compound that forms a complex with a metal ion is used as an additive for preventing deterioration of an anode caused by metal ions dissolved out from the surface of a cathode (Journal of Power Sources, 119-121, 378~382 (2003)).

SUMMARY OF THE INVENTION

Therefore, the present invention has been made in view of the above-mentioned problems. The inventors of the present invention have found that when a compound having at least two cyano groups and a double bond in its structure, the cyano groups being in a trans-formation to the double bond, is used for forming an electrolyte, it is possible to significantly improve the lifespan of an electrochemical device as compared to a similar compound having no double bond or having a double bond and cyano groups in a cis-formation to the double bond.

Therefore, it is an object of the present invention to provide an additive for a non-aqueous electrolyte showing the above characteristics and a non-aqueous electrolyte comprising the additive.

It is another object of the present invention to provide an electrochemical device using the above non-aqueous electrolyte and having improved quality.

In order to achieve the above-mentioned object, there is provided an additive for a non-aqueous electrolyte, which is a compound represented by the following Formula 1 and having a double bond and at least two cyano groups, wherein the two cyano groups are in a trans-formation to the double bond:

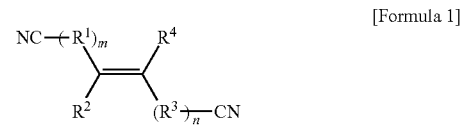

[Formula 1]

wherein each of $R^1$ and $R^3$ independently represents a $C_1$~$C_{12}$ alkylene, a $C_1$~$C_{12}$ haloalkylene, a $C_2$~$C_{12}$ alkenylene, a $C_2$~$C_{12}$ alkynylene, a $C_7$~$C_{18}$ benzylene or a $C_7$~$C_{18}$ halobenzylene;

each of $R^2$ and $R^4$ independently represents a hydrogen atom, a $C_1$~$C_{12}$ alkyl, a $C_1$~$C_{12}$ haloalkyl, a $C_2$~$C_{12}$ alkenyl, a $C_1$~$C_{12}$ alkoxy, a $C_3$~$C_{18}$ aryl, a $C_3$~$C_{18}$ haloaryl, a $C_7$~$C_{18}$ benzyl, a $C_7$~$C_{18}$ halobenzyl, a halogen atom or a cyano group (—CN); and each of m and n independently represents 0 or 1.

Also, the present invention provides a non-aqueous electrolyte comprising: an electrolyte salt; an organic solvent; and an additive for a non-aqueous electrolyte, wherein the additive is a compound represented by the above Formula 1 and having a double bond and at least two cyano groups, the cyano groups being in a trans-formation to the double bond.

Further, the present invention provides an electrode comprising a compound represented by the above Formula 1 and having a double bond and at least two cyano groups, the cyano groups being in a trans-formation to the double bond, wherein the compound represented by Formula 1 is coated onto a surface of the electrode or forms a complex with the electrode active material.

Further, the present invention provides an electrochemical device comprising a cathode, an anode and a non-aqueous electrolyte, wherein the non-aqueous electrolyte is the non-aqueous electrolyte according to the present invention.

Further, the present invention provides an electrochemical device comprising a cathode, an anode and a non-aqueous electrolyte, wherein either or both of the cathode and the anode are the electrode according to the present invention.

BRIEF DESCRIPTION OF THE DRAWINGS

The foregoing and other objects, features and advantages of the present invention will become more apparent from the following detailed description when taken in conjunction with the accompanying drawings in which:

FIG. 3 is a graph showing the results obtained after charging/discharging the batteries manufactured according to Example 1 and Comparative Examples 1~4.

DETAILED DESCRIPTION OF THE INVENTION

Figure 1:
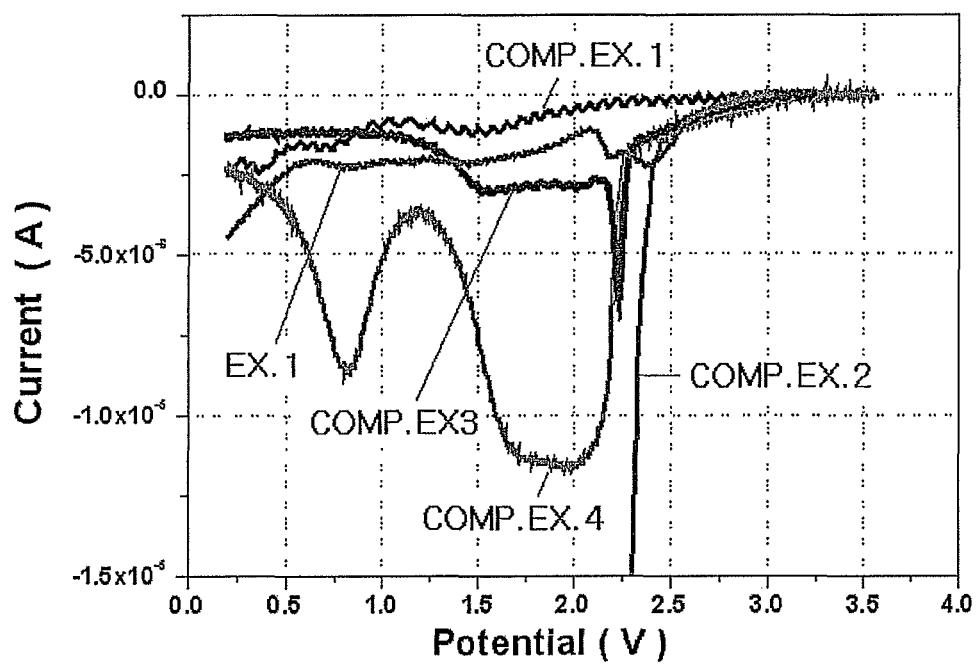
FIG. 1 is a graph showing the results of linear sweep voltammetry of the electrolytes prepared from Example 1 and Comparative Examples 1~4.

Hereinafter, the present invention will be explained in more detail.

According to the present invention, it is demonstrated that compounds having at least two cyano groups provide different effects, such as effects of imparting heat resistance to batteries, depending on stereochemical transformations of the cyano groups, when they are used for forming an electrolyte for an electrochemical device. Based on this, the present invention provides an additive for a non-aqueous electrolyte that realizes optimum quality of a battery. Thus, the electrochemical device according to the present invention shows improved overall quality, including improved room-temperature and high-temperature cycle characteristics.

In general, in the case of a lithium secondary battery as an electrochemical device, a kind of passivation layer is formed on the cathode of the battery, particularly at a site where surface bonding exists or at an activation site, via electrochemical oxidative decomposition of the electrolyte used in the battery. The above passivation layer increases impedance to co-intercalation of lithium ions into the cathode active material. Additionally, during repeated charge/discharge cycles, the cathode active material, such as $LiCoO_2$, $LiMn_2O_4$ or $LiNiO_2$, undergoes a structural collapse or the electrolyte causes a chemical dissolution reaction, resulting in dissolution of Co, Mn and Ni ions. Such reactions inevitably result in degradation of the cathode itself. At the same time, the metal ions cause electrodeposition on the surface of the anode. Such metals deposited on the anode via electrodeposition generally show a high reactivity to the electrolyte. Therefore, the amount of reversible lithium decreases and irreversible reactions increase during repeated charge/discharge cycles, resulting in degradation of the capacity and lifespan of the battery.

The inventors of the present invention have found that a compound containing two cyano groups present in a trans-formation to a double bond has a significantly greater tendency to form a complex with metal ions, such as Co, Mn or Ni, as compared to the compounds other than the above compound. Therefore, the additive for a non-aqueous electrolyte having two cyano groups present in a trans-formation to the double bond can be adsorbed onto the bonding site or activation site of the surface of the cathode in the electrochemical device, such as a battery, using the same additive to inhibit oxidative decomposition of the non-aqueous electrolyte, or to form a complex with metal ions dissolved out from the cathode, thereby preventing the metal ions from being electrodeposited on the anode.

The non-aqueous electrolyte according to the present invention comprises: an electrolyte salt; an organic solvent; and an additive for a non-aqueous electrolyte, wherein the additive is the additive according to the present invention.

Particularly, the additive is a compound represented by the above Formula 1 and having a double bond and at least two cyano groups, the cyano groups being in a trans-formation to the double bond. Non-limiting examples of the compound include 1,4-dicyanobutene, 1,6-dicyanohexene, 1,5-dicyanohexene, 1,4-dicyano-1,4-diphenylbutene, 1,4-dicyano-1,4-difluorobutene, 1,4-dicyano-2,3-dimethylbutene, 1,1,4,4-tetracyanobutene, or the like.

The additive is used in the non-aqueous electrolyte in a controlled amount to improve the overall quality of an electrochemical device. Preferably, the additive may be used in an amount of 0.01~10 wt % in the non-aqueous electrolyte. If the additive is used in an amount of less than 0.01 wt %, it is not possible to sufficiently improve the cycle characteristics of a battery. If the additive is used in an amount of greater than 10 wt %, a surplus amount of additive may cause side reactions, and thus may cause a drop in the capacity of the battery, an increase in the viscosity of the electrolyte and a drop in the ion conductivity of the electrolyte, resulting in degradation of the overall quality of the battery.

There is no particular limitation in the electrolyte salt, as long as the electrolyte salt is one currently used for a conventional non-aqueous electrolyte.

The electrolyte salt may be formed of a combination of, but is not limited to: (i) a cation selected from the group consisting of $Li^+$, $Na^+$ and $K^+$; and (ii) an anion selected from the group consisting of ETC, $BF_4^-$, $Cl^-$, $Br^-$, $I^-$, $ClO_4^-$, $AsF_6^-$, $CH_3CO_2^-$, $CF_3SO_3^-$, $N(CF_3SO_2)_2^-$ and $C(CF_2SO_2)_3^-$. Such electrolyte salts may be used alone or in combination. Particularly, a lithium salt is preferred.

There is no particular limitation in the organic solvent, as long as the solvent is one currently used for a non-aqueous electrolyte. Particular examples of the organic solvent include cyclic carbonates, linear carbonates, lactones, ethers, esters, sulfoxides, acetonitriles, lactams and/or ketones.

Particular examples of the cyclic carbonates include ethylene carbonate (EC), propylene carbonate (PC), butylene carbonate (BC), pentylene carbonate, fluoroethylene carbonate (FEC), or the like. Particular examples of the linear carbonates include diethyl carbonate (DEC), dimethyl carbonate (DMC), dipropyl carbonate (DPC), dibutyl carbonate, ethyl methyl carbonate (EMC), methyl propyl carbonate (MPC), methyl isopropyl carbonate, methyl butyl carbonate, ethyl propyl carbonate, or the like. Particular examples of the lactones include gamma-butyrolactone (GBL) and those of ethers include dibutyl ether, tetrahydrofuran, 2-methyl-tetrahydrofuran, 1,4-dioxane, 1,2-dimethoxyethane, 1,2-diethoxyethane, or the like. Particular examples of the esters include methyl formate, ethyl formate, propyl formate, methyl acetate, ethyl acetate, propyl acetate, methyl propionate, ethyl propionate, butyl propionate, methyl pivalate, or the like. Additionally, particular examples of the sulfoxides include dimethyl sulfoxide, or the like, and those of the lactams include N-methyl pyrrolidone (NMP), or the like. Further, particular examples of the ketones include polymethylvinyl ketone. Halogen derivatives of the above organic solvents may also be used. Such organic solvents may be used alone or in combination.

In addition, the present invention provides an electrode comprising a compound represented by the above Formula 1 and having a double bond and at least two cyano groups, the cyano groups being in a trans-formation to the double bond, wherein the compound represented by Formula 1 is coated onto the surface of the electrode or forms a complex with the electrode active material.

The electrode according to the present invention may be obtained by applying a solution containing the compound represented by the above Formula 1 onto an electrode. Preferably, the solution containing the compound represented by Formula 1 is the non-aqueous electrolyte according to the present invention. Additionally, the electrode may be coated directly with the solution containing the compound represented by Formula 1, or may be coated by allowing the non-aqueous electrolyte to be in contact with the electrode in the electrochemical device comprising the same electrode and non-aqueous electrolyte.

In addition to the above, the present invention provides an electrochemical device comprising a cathode, an anode and a non-aqueous electrolyte, wherein the electrolyte is the non-aqueous electrolyte according to the present invention.

Further, the present invention provides an electrochemical device comprising a cathode, an anode and a non-aqueous electrolyte, wherein the cathode and/or the anode are the electrode according to the present invention. Herein, the electrolyte may be the non-aqueous electrolyte according to the present invention.

Such electrochemical devices include any devices in which electrochemical reactions occur, and particular examples thereof include all kinds of primary batteries, secondary batteries, fuel cells, solar cells or capacitors. Preferably, the electrochemical device is a secondary battery. A lithium secondary battery including a lithium metal secondary battery, lithium ion secondary battery, lithium polymer secondary battery or lithium ion polymer secondary battery is more preferred.

The electrochemical device may be manufactured via a conventional method known to one skilled in the art. In one embodiment of the method for manufacturing the electrochemical device, an electrode assembly having a cathode, an anode and a separator interposed between both electrodes is formed, and then the non-aqueous electrolyte according to the present invention is injected into the electrode assembly.

The electrode used in the electrochemical device may be manufactured by a conventional method known to one skilled in the art. For example, an electrode active material may be mixed with a solvent, and optionally with a binder, a conductive agent and a dispersant, and the mixture is agitated to provide slurry. Then, the slurry is applied onto a metal collector, and the collector coated with the slurry is compressed and dried to provide an electrode.

The electrode active material includes a cathode active material or an anode active material.

Cathode active materials that may be used in the present invention include: lithium transition metal composite oxides, such as $LiM_xO_y$ (M=Co, Ni, Mn, $Co_aNi_bMn_c$) (e.g. lithium manganese composite oxides such as $LiMn_2O_4$, lithium nickel oxides such as $LiNiO_2$, lithium cobalt oxides such as $LiCoO_2$, other oxides obtained by substituting manganese, nickel and cobalt in the above oxides partially with other transition metals, or lithium-containing vanadium oxide, etc.); or calcogenides, such as manganese dioxide, titanium disulfide, molybdenum disulfide, etc. However, the scope of the present invention is not limited thereto.

Anode active materials that may be used in the present invention include those currently used anodes for electrochemical devices. Particular examples of the anode active materials include lithium metal, lithium alloys, carbon, petroleum coke, activated carbon, graphite or carbon fiber capable of lithium ion intercalation/deintercalation. Other metal oxides capable of lithium intercalation/deintercalation and having a potential Vs. $Li/Li^+$ of less than 2V (for example, $TiO_2$ or $SnO_2$) may also be used. Particularly, carbonaceous materials, such as graphite, carbon fiber or activated carbon are preferred.

There is no particular limitation in the current collector, as long as the collector is formed of a highly conductive metal, allows easy attachment of slurry of an electrode active material thereto, and has no reactivity in the drive voltage range of the battery. Non-limiting examples of a cathode collector include foil formed of aluminum, nickel or a combination thereof. Non-limiting examples of an anode collector include foil formed of copper, gold, nickel, copper alloys or a combination thereof.

The electrochemical device according to the present invention may comprise a separator. Although there is no particular limitation in the separator that may be used in the present invention, a porous separator is preferred, and particular examples thereof include polypropylene-based, polyethylene-based, and polyolefin-based porous separators.

Further, although there is no particular limitation in the outer shape of the electrochemical device according to the present invention, the electrochemical device may have a cylindrical shape using a can, a prismatic shape, a pouch-like shape or a coin-like shape.

Reference will now be made in detail to the preferred embodiments of the present invention. It is to be understood that the following examples are illustrative only and the present invention is not limited thereto.

Example 1

To an organic solvent containing ethylene carbonate (EC) and ethyl methyl carbonate (EMC) in a ratio of 1:2 (EC:EMC, v/v), 1M $LiBF_4$ was dissolved to provide a solution. Then, 2 wt % of $Co(BF_4)_2$ and 5 wt % of 1,4-dicyano-2-butene (Formula 2) were added to the solution to provide an electrolyte.

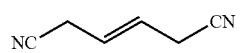

[Formula 2]

As a cathode active material, $LiCoO_2$ was used. Then, PVDF as a binder and acetylene black as a conductive agent were added to NMP (N-methyl 2-pyrrolidone) to provide cathode slurry, which, in turn, was coated onto an aluminum (Al) collector to provide a cathode.

As an anode active material, artificial graphite was used. Then, PVDF as a binder and acetylene black as a conductive agent were added to NMP (N-methyl 2-pyrrolidone) to provide anode slurry, which, in turn, was coated onto a copper (Cu) collector to provide an anode.

A polyolefin-based separator was inserted between the cathode and the anode to provide an electrode assembly, and the above non-aqueous electrolyte was injected to the electrode assembly to provide a coin type battery.

Comparative Example 1

A battery was provided in the same manner as described in Example 1, except that the electrolyte used in this Example was obtained by dissolving 1M $LiBF_4$ into an organic solvent containing ethylene carbonate (EC) and ethyl methyl carbonate (EMC) in a ratio of 1:2 (EC:EMC, v/v).

Comparative Example 1

A battery was provided in the same manner as described in Example 1, except that 1,4-dicyano-2-butene was not added for preparing the electrolyte.

Comparative Example 3

A battery was provided in the same manner as described in Example 1, except that succinonitrile (Formula 3) was added for preparing the electrolyte instead of 1,4-dicyano-2-butene.

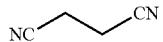

[Formula 3]

Comparative Example 3

A battery was provided in the same manner as described in Example 1, except that 1,2-dicyano benzene (Formula 4) was added for preparing the electrolyte instead of 1,4-dicyano-2-butene.

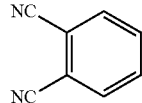

[Formula 4]

Experimental Example 1: Co Ion Electrodeposition Test

Linear sweep voltammetry for the electrolytes prepared from Example 1 and Comparative Examples 1~4 was performed. The results are shown in FIG. 1.

A Pt disc type electrode was used as a working electrode, and lithium metal and a Pt wire electrode were used as a reference electrode and a supplementary electrode, respectively. The scanning rate was set to 10 mV/s. The test was performed in a glove box under argon atmosphere containing 10 ppm or less of moistures and oxygen.

As can be seen from FIG. 1, the electrolytes according to Example 1 and Comparative Examples 2~4 containing $Co(BF_4)_2$ provide a higher current as compared to the electrolyte containing no additive according to Comparative Example 1. It is thought that this results from Co metal deposition caused by electrochemical reduction of Co ions.

Additionally, among the electrolytes according to Example 1 and Comparative Examples 2~4, the electrolyte containing 1,4-dicyano-2-butene according to Example 1 provides the lowest current. It is thought that 1,4-dicyano-2-butene forms a complex with Co ions to the highest degree so that the concentration of free Co ions in the electrolyte is the lowest.

Experimental Example 2: X-Ray Structural Analysis for Complex Formation and Single Crystal After storing the electrolytes according to Example 1 and Comparative Examples 1~4 at room temperature for 24 hours, only the electrolyte according to Example 1 showed precipitation of crystals.

Figure 2:
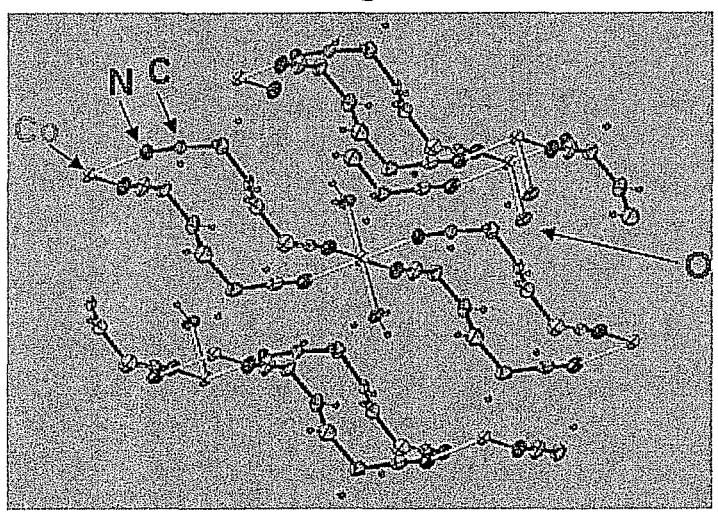
FIG. 2 is a structural view showing the single crystal formed between 1,4-dicyano-2-butene contained in the electrolyte prepared according to Example 1 and Co ions, as measured by X-ray analysis.

FIG. 2 shows the results of X-ray structural analysis for the single crystal formed between 1,4-dicyano-2-butene and Co ions. As can be seen from FIG. 2, two cyano groups of 1,4-dicyano-2-butene are in a trans-formation in the Co complex crystal. In other words, as compared to succinonitrile (Comparative Example 3) having no double bond and containing two cyano groups whose positions are variable and 1,2-dicyano benzene (Comparative Example 4) containing two cyano groups in a fixed cis-formation, 1,4-dicyano-2-butene containing two cyano groups in a trans-formation forms a complex with Co well.

Experimental Example 3: Hot Box Test

The batteries according to Example 1 and Comparative Examples 1~4 were subjected to charge/discharge cycles at 60° C. under 0.5 C. The results are shown in FIG. 3.

As can be seen from FIG. 3, the battery according to Example 1 shows the highest quality in the 60° C. charge/discharge test. This indicates that Co complex formation ability of an electrolyte has a close interrelation with the quality of the battery using the electrolyte.

INDUSTRIAL APPLICABILITY

As can be seen from the foregoing, the additive for a non-aqueous electrolyte according to the present invention can be adsorbed onto the bonding site or activation site of the surface of the cathode in the electrochemical device using the same additive to inhibit oxidative decomposition of the non-aqueous electrolyte, or to form a complex with metal ions dissolved out from the cathode, thereby preventing the metal ions from being electrodeposited on the anode. Therefore, the electrochemical device comprising the additive for a non-aqueous electrolyte can provide improved overall quality, including room-temperature and high-temperature cycle life characteristics.

Although several preferred embodiments of the present invention have been described for illustrative purposes, those skilled in the art will appreciate that various modifications, additions and substitutions are possible, without departing from the scope and spirit of the invention as disclosed in the accompanying claims.

What is claimed:

1. An electrode comprising a compound represented by Formula 1 and having a double bond and at least two cyano groups, the cyano groups being only in a trans-formation to the double bond, wherein the compound represented by Formula 1 is coated onto a surface of the electrode or forms a complex with an electrode active material:

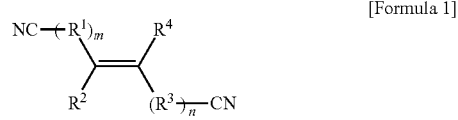

[Formula 1]

wherein the compound represented by Formula 1 is selected from the group consisting of 1,4-dicyano-1,4-diphenylbutene, 1,4-dicyano-1,4-difluorobutene, 1,4-dicyano-2,3-dimethylbutene and 1,1,4,4-tetracyanobutene.

2. The electrode as claimed in claim 1, which is obtained by applying a solution containing the compound represented by Formula 1 onto the electrode.

3. The electrode as claimed in claim 1, wherein the compound represented by Formula 1 is 1,1,4,4-tetracyanobutene.

4. An electrochemical device comprising a cathode, an anode and a non-aqueous electrolyte, (i) the cathode and/or the anode comprises a compound represented by Formula 1 and having a double bond and at least two cyano groups, the cyano groups being only in a trans-formation to the double bond, wherein the compound represented by Formula 1 is coated onto a surface of the electrode or forms a complex with an electrode active material:

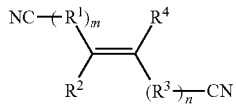

[Formula 1]

wherein the compound represented by Formula 1 is selected from the group consisting of 1,4-dicyano-1,4-diphenylbutene, 1,4-dicyano-1,4-difluorobutene, 1,4-dicyano-2,3-dimethylbutene and 1,1,4,4-tetracyanobutene.

5. The electrochemical device as claimed in claim 4, wherein the compound represented by Formula 1 is 1,1,4,4-tetracyanobutene.

* * * * *